United States Patent
Buckman et al.

(10) Patent No.: US 6,520,850 B1
(45) Date of Patent: Feb. 18, 2003

(54) DISTRIBUTOR VALVE WITH INTEGRALLY MOLDED AIR DEFLECTOR VANES FOR DISTRIBUTOR BOX OF HVAC SYSTEM

(75) Inventors: Earl Henry Buckman, Auburn Hills, MI (US); Eric Hupfel, Auburn Hills, MI (US); Calin Maginean, Auburn Hills, MI (US)

(73) Assignee: Valeo Climate Control Corporation, Auburn Hills, MI (US)

( * ) Notice: Subject to any disclaimer, the term of this patent is extended or adjusted under 35 U.S.C. 154(b) by 0 days.

(21) Appl. No.: 10/139,679

(22) Filed: May 7, 2002

(51) Int. Cl.$^7$ .................................................. B60S 1/54
(52) U.S. Cl. ..................... 454/121; 454/69; 454/160; 137/338
(58) Field of Search .................... 454/121, 143, 454/148, 156, 160, 69; 137/833, 338; 251/126, 127

(56) References Cited

U.S. PATENT DOCUMENTS

| | | | | |
|---|---|---|---|---|
| 3,960,177 A | * | 6/1976 | Baumann | 137/625.31 |
| 4,852,638 A | * | 8/1989 | Hildebrand et al. | 137/513.5 |
| 4,972,992 A | * | 11/1990 | Scheidel et al. | 165/103 |
| 5,220,944 A | * | 6/1993 | Burnett et al. | 137/625.44 |
| 5,476,418 A | * | 12/1995 | Loup | 454/121 |
| 5,679,073 A | * | 10/1997 | Hsieh et al. | 137/625.31 |
| 5,983,987 A | * | 11/1999 | Weindorf | 165/103 |
| 6,047,951 A | * | 4/2000 | Ito et al. | 251/306 |
| 6,257,155 B1 | * | 7/2001 | Greene | 110/147 |
| 6,296,563 B1 | * | 10/2001 | Vincent | 454/121 |
| 6,319,111 B1 | * | 11/2001 | Queinnec | 454/121 |
| 6,386,966 B1 | * | 5/2002 | Kuwayama et al. | 181/225 |
| 6,412,755 B2 | * | 7/2002 | Ito | 251/173 |

* cited by examiner

*Primary Examiner*—Derek Boles
(74) *Attorney, Agent, or Firm*—Liniak, Berenato & White

(57) ABSTRACT

A distributor box for a heating, ventilating and/or air conditioning apparatus for a passenger compartment of a motor vehicle, comprises an air inlet for admitting a heated airflow and/or a cold airflow into the distributor box therethrough, a plurality of air outlets for leading the airflow to different zones of the passenger compartment, and at least one distributor valve pivotally mounted within the distributor box for pivoting movement between a plurality of positions whereby to distribute said airflow between the plurality of outlets. The distributor valve is provided with vane members on at least one face surface thereof for guiding the airflow from the air inlet toward at least one of the air outlets. The vane member is integrally formed on the distributor valve.

17 Claims, 5 Drawing Sheets

DISTRIBUTOR VALVE WITH INTEGRALLY MOLDED AIR DEFLECTOR VANES FOR DISTRIBUTOR BOX OF HVAC SYSTEM

BACKGROUND OF THE INVENTION

1. Field of the Invention

This present invention relates to heating, ventilating and air conditioning systems for a passenger compartment of a motor vehicle in general, and more particularly to a distributor box that forms part of such an installation.

2. Description of the Prior Art

In heating, ventilating and air conditioning systems (HVAC) for a passenger compartment of a motor vehicle, it is known to provide a distributor box, or distribution housing, of a type which includes an air inlet arranged to admit a stream of cold air and/or a stream of heated air, together with a plurality of air outlets which are open towards various different zones within the passenger compartment of the vehicle. These outlets comprise, in particular, a defrosting air outlet port, which is open towards a windshield of the vehicle, and demisting air outlet port, which is open towards side windows of the vehicle. The distributor box also contains a distributor valve that is mounted for pivoting movement about an axis inside the distributor box, for adjusting the distribution of the air between the various air outlets.

The air inlet of the distributor box is connected to the outlet of a heater housing which is adapted for producing a stream of cold air and a stream of hot air in adjustable proportions, according to the particular conditions required by the user. Conventionally, apart from the defrosting air outlet which is open towards the windshield and the demisting air outlet port which is open towards side windows of the vehicle, the distributor box also has at least one ventilating air outlet which is open at the level of the fascia of the vehicle, together with at least one lower air inlet which is open into the lower part of the passenger compartment, that is to say in such a way as to direct air towards the feet of the occupants of the vehicle.

The distributor valve may in particular be put into a defrosting position in which a stream of air is delivered towards the windshield, and a position which may be referred to as its "defrosting and foot warming" position, in which a stream of air is delivered simultaneously towards the windshield and towards the feet of the occupants of the vehicle. In these two positions, the stream of cold air and the stream of heated air delivered towards the windshield have a tendency to mix, so that the temperature of the air, thus mixed, is lower than the temperature of the heated air stream, thus having reduced effectiveness for deicing and de-misting the windshield. Typically, the distributor valve having opposite flat surfaces has very little control over the direction of the airflow within the distributor box.

The mixed airflow of hot and cold air enters the distributor box, heats the wall of the distributor box, and then turns its course at some angle, usually 90°, to the direction towards the air outlets. That turning movement of the incoming airflow creates substantial turbulence and significant resistance to the movement of the airflow within the distributor box.

Thus, there is a need for a means to reduce turbulence and airflow resistance in the distributor box.

SUMMARY OF THE INVENTION

The present invention provides a novel arrangement of a distributor box for a heating, ventilation and/or air conditioning apparatus for a passenger compartment of a motor vehicle. The distributor box of the present invention comprises an air inlet for admitting a heated airflow and/or a cold airflow into the distributor box therethrough, a plurality of air outlets for leading the airflow to different zones of the passenger compartment, and at least one distributor valve pivotally mounted within the distributor box for pivoting movement between a plurality of positions whereby to distribute said airflow between the plurality of outlets. The distributor valve is provided with at least one vane member on at least one face surface thereof for guiding the airflow from the air inlet toward at least one of the air outlets. The vane member is integrally formed on the distributor valve.

Preferably, each of the face surfaces of the distributor valve in accordance with the present invention is provided with two vane members. However, any appropriate number of the vane members may be provided on each of the face surfaces of the distributor valve, such as three, four, etc. Moreover, the number of vane members on one of the opposite face surfaces of the distributor valve may differ.

Alternatively, only one of the face surfaces of the distributor valve may be provided with at least one vane member.

In accordance with the preferred embodiment of the present invention, each of the vane members is homogeneously formed with the distributor valve as a unitary single-piece part.

Each of the vane members has curved shape, such L-shape, so as to redirect said the airflow entering the distribution box toward the air outlets.

Therefore, the distribution box of the heating, ventilation and/or air conditioning apparatus for the passenger compartment of the motor vehicle in accordance with the present invention includes a novel arrangement of the pivoting distributor valve that provides less turbulence, better control and less resistance to the movement of the airflow within the front distribution chamber.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
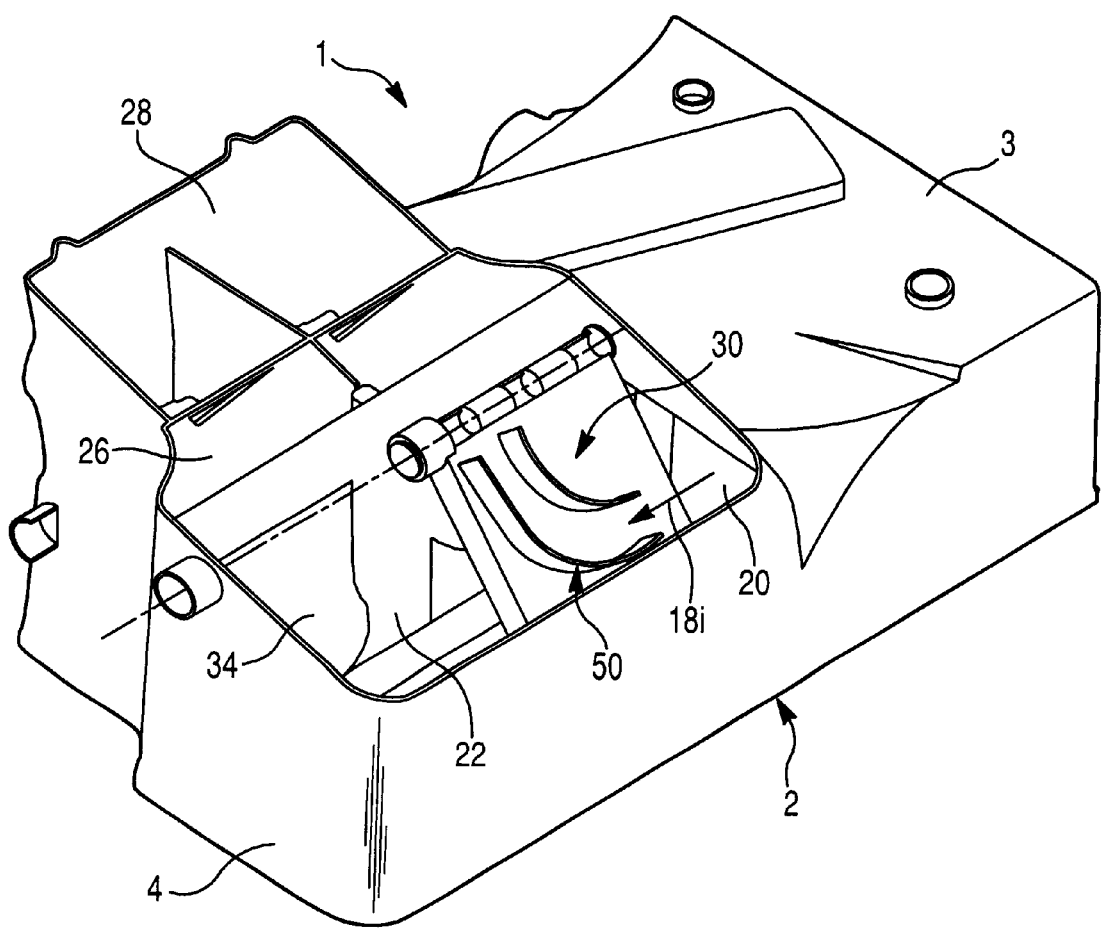
FIG. 1 is a partial perspective view of a heating and ventilation apparatus in accordance with the present invention.

FIG. 1 of the drawings illustrates a heating, ventilation and/or air conditioning (HVAC) apparatus for a passenger compartment of a motor vehicle (not shown) in accordance with the present invention, generally indicated at 1. The heat heating and ventilation apparatus 1 comprises a casing 2 having two integral parts: a heater housing 3 and a distributor box 4. Preferably, the casing 2 is homogenously formed as a unitary, single-piece part. Alternatively, the heater housing 3 and the distributor box 4 may be bonded or fastened to each other.

A blower unit 6 is attached to the heater housing 3. The blower unit 6 provides a stream $F_A$ of blown air, which may be conditioned and which is either drawn from outside the passenger compartment of the vehicle or recirculated from the latter.

Figure 2:
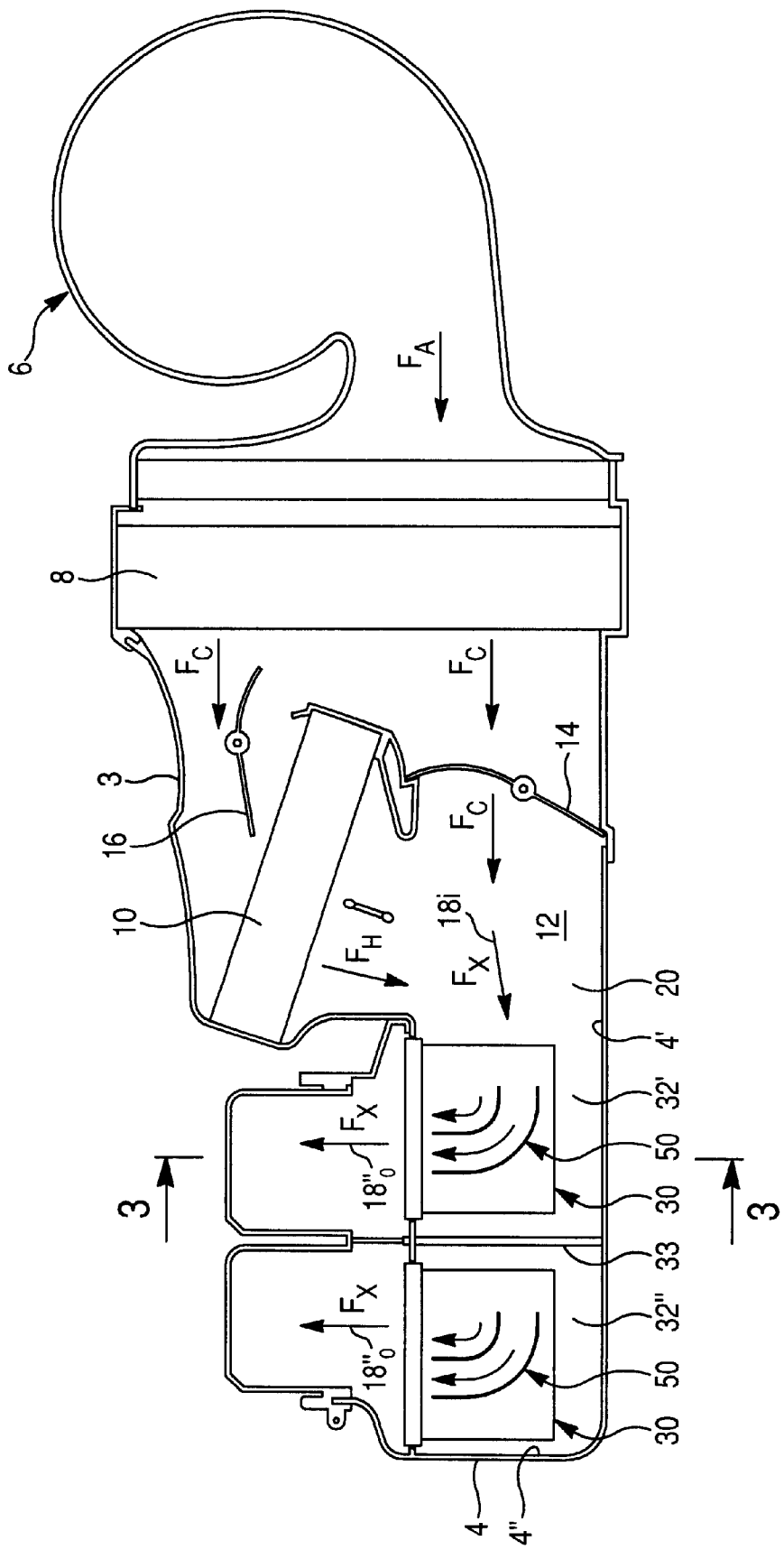
FIG. 2 is a partial cross-sectional view of the heating and ventilation apparatus in accordance with the present invention.

In the exemplary embodiment of the present invention, illustrated in FIG. 2, the heater housing 3 accommodates an evaporator 8 and a heater core 10. Alternatively, the evaporator 8 may be disposed outside the heater housing 3. In use the evaporator may be supplied with coolant for selectively cooling the air stream $F_A$ from the blower unit 6. An outlet airflow $F_C$ of the evaporator 8 is fed to an air-mixing chamber 12 via a cold air valve 14 and/or via a hot air valve 16 through the heater core 10. The heater core 10 is adapted to heat the airflow $F_C$ and provide a heated airflow $F_H$ to the air-mixing chamber 12. The air-mixing chamber 12 is provided for mixing the cold airflow $F_C$ and the heated airflow $F_H$, thus creating a mixed airflow $F_X$. The cold air valve 14 and the hot air valve 16 selectively adjust the proportion between the cold airflow $F_C$ and the heated airflow $F_H$ in the mixed airflow $F_X$. Constructed as described above, the heater housing 3 enables a stream of the cold airflow $F_C$ and the heated airflow $F_H$ to be obtained in adjustable proportions, so that what is referred to as stratification of temperature can be obtained.

The distributor box 4 has an inlet 20 communicating directly with the air-mixing chamber 12 of the heater housing 3, and a plurality of air outlets 22, 24, 26 and 28. In the preferred embodiment of the present invention, the air outlet 22 is connected to a front face opening duct (not shown) typically provided at an instrument panel of the motor vehicle, the air outlet 24 is connected to a front foot opening duct (not shown), the air outlet 26 is connected to a demisting duct (not shown), and the air outlet 28 is connected to a defrosting duct (not shown). It will be appreciated that any other arrangement of the air outlets of the distributor box 4 known to those skilled in the art is within the scope of the present invention.

The distributor box 4 further includes at least one distributor flap valve 30 selectively actuated by any appropriate manual or servo actuator well known in the art. In the preferred embodiment of the present invention as illustrated in FIG. 2, the distributor box 4 is provided with two distributor valves 30 (only one shown in FIG. 1). It will be appreciated by those skilled in the art that any appropriate number of the distributor valves 30 may be provided in the distributor box 4. Preferably, the two distributor valves 30 of the present invention are independently operable.

Figure 3:
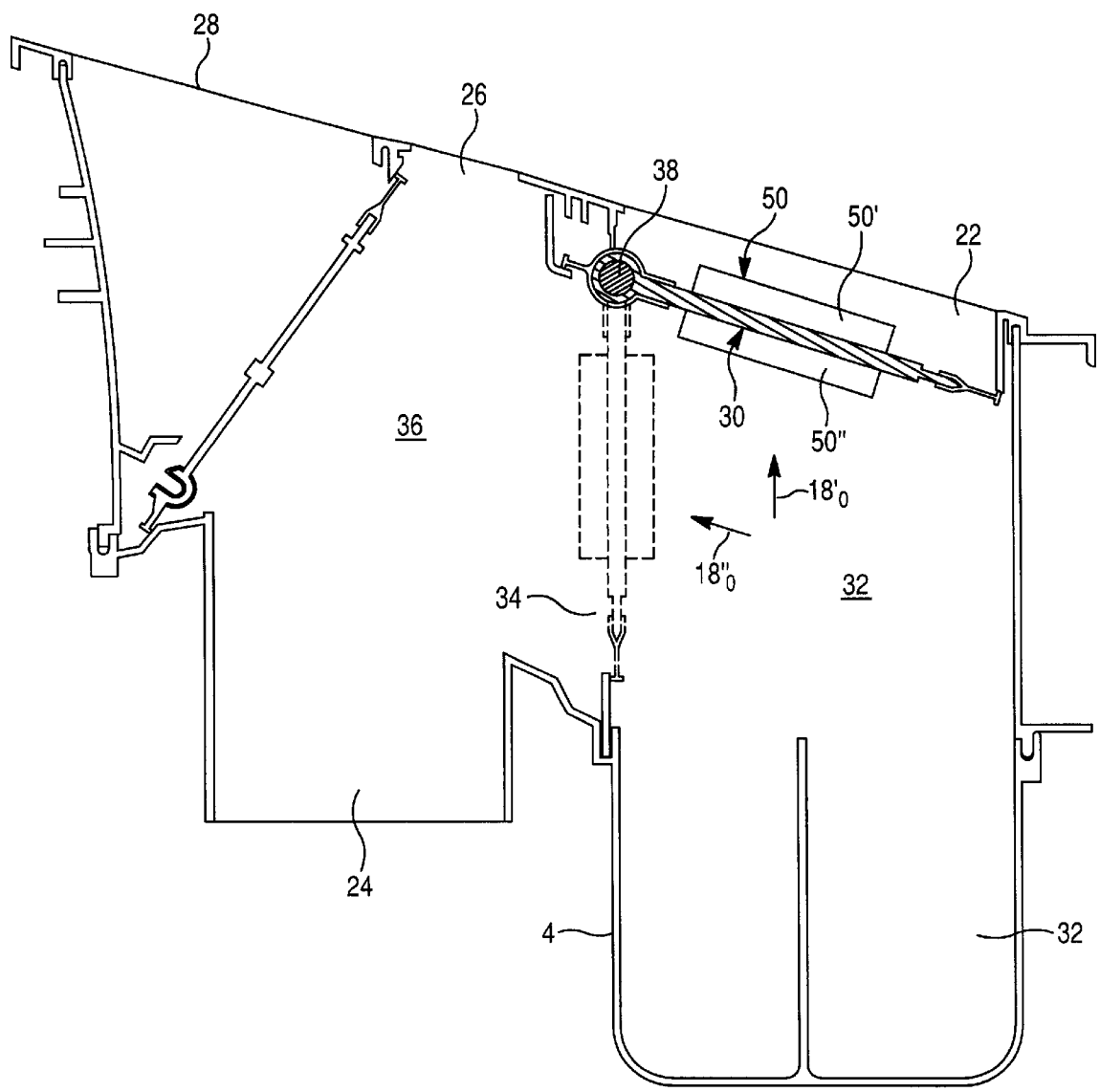
FIG. 3 is a partial cross-sectional view of a distributor box in accordance with the present invention.
Figure 4:
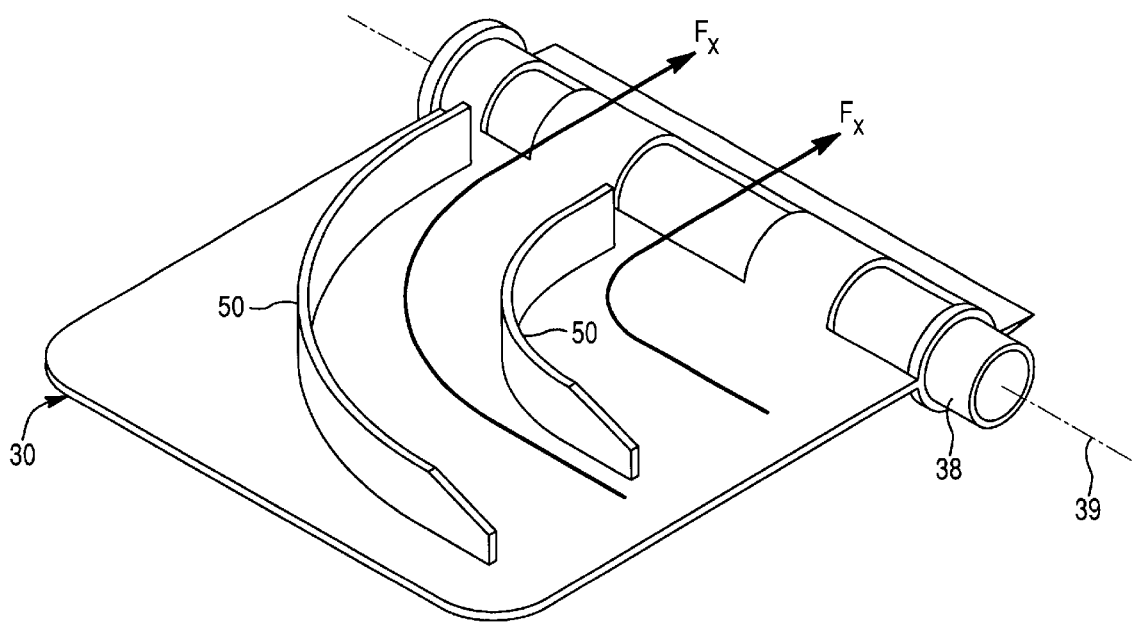
FIG. 4 is a perspective view of a distributor valve in accordance with the present invention.

As illustrated in detail in FIG. 3, the distributor valve 30 is mounted in the distributor box 4 for pivoting movement about a pivot pin 38 (defining a pivot axis 39 of the distributor valve 30, shown on FIG. 4) within a distribution chamber 32 between a plurality of positions whereby to selectively distribute the airflow between the air outlet 22 and an air outlet 34 leading to a back chamber 36. Thus, the distribution chamber 32 forms a guide channel having an inlet portion substantially parallel with respect to the pivot axis 39 of the distributor valve 30 and two outlet portions each oriented in the substantially transverse direction with respect to the inlet portion. The inlet portion is defined by the inlet 20, while each of the outlet portions is defined by the outlets 22 and 34.

As illustrated in FIG. 2, the distribution chamber 32 is divided by a separation wall 33 into two separate chambers 32' and 32". As further illustrated in FIG. 3, the back chamber 36 directly communicates with the air outlets 24, 26 and 28. The distributor valve 30 pivots about the pivot pin 38 between two outermost positions: an uppermost position indicated in solid line in FIG. 3, and a lowermost position indicated in dot lines in FIG. 3. As noted above, the distributor valve 30 is infinitely adjustable between these two outermost positions. As illustrated, the pivot pin 38 (thus, the axis of rotation of the distributor valve 30) is disposed substantially parallel to a wall 4' of the distributor box 4.

Figure 5:
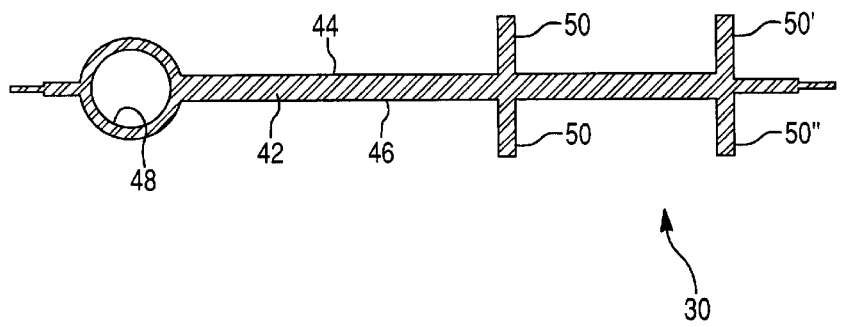
FIG. 5 is a cross-sectional view of the distributor valve in accordance with the preferred embodiment of the present invention.

The distributor valve 30 includes a body 42 having an opposite face surfaces 44 and 46, and a bore 48 receiving the pivot pin 38 therein. The pivot pin 38 is secured in the distributor box 4 of the casing 2. Preferably, the face surfaces 44 and 46 are substantially flat. Moreover, as shown in FIG. 5, in order to facilitate the movement of the airflow $F_X$ within the distribution chamber 32 and reduce its turbulence, each of the face surfaces 44 and 46 is provided with at least one vane member 50 contoured for guiding the airflow $F_X$ and for a smooth transition thereof entering the distribution chamber 32 of the distributor box 4 from the air-mixing chamber 12 of the heater housing 3 toward at least one of the air outlets 22 or 34. As illustrated in FIG. 5, the face surface 44 is provided with at least one vane member 50', while the face surface 46 is provided with at least one vane member 50". Preferably, each of the face surfaces 44 and 46 of the distributor valve 30 in accordance with the present invention is provided with two vane members 50. It will be appreciated by those skilled in the art that any appropriate number of the vane members 50 may be provided on each of the face surfaces of the distributor valve 30, such as three, four, etc. Moreover, the number of vane members on one of the opposite face surfaces 44 and 46 of the distributor valve 30 may differ.

Figure 6:
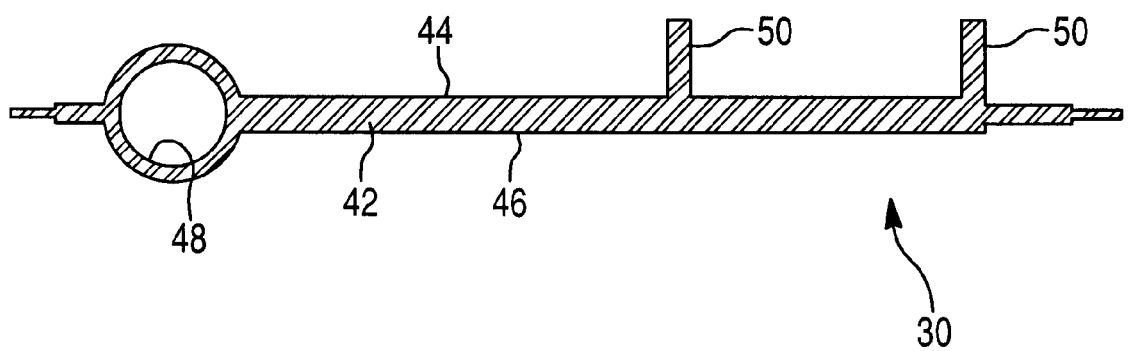
FIG. 6 is a cross-sectional view of the distributor valve in accordance with the alternative embodiment of the present invention.

Alternatively, only one of the face surfaces 44 and 46 of the distributor valve 30 may be provided with at least one vane member 50. Preferably, as shown in FIG. 6, two vane members 50 outwardly extend from the face surface 44.

It will be appreciated that each of the vane members 50 is integrally formed on the distributor valve 30. In accordance with the preferred embodiment of the present invention, shown in FIGS. 5 and 6, each of the vane members 50 is homogeneously formed with the distributor valve 30 as a unitary single-piece part, and extends outwardly from the face surfaces 44 and 46 substantially perpendicularly thereto. Preferably, the distributor valve 30 is manufactured by plastic molding.

As further illustrated in the accompanying drawings, each of the vane members 50 is contoured to a substantially L-shape so as to facilitate a smooth transition of the airflow $F_X$ entering the distribution chamber 32 toward the air outlets 22 and/or 34 at substantially 90° angle with respect to the outlet direction. It will be appreciated that any other appropriate shapes and angles of inclination of the vane members 50 depending on the general layout of the air inlet and air outlets of the front distribution chamber, will within the scope of the present invention.

In operation, as can be seen in FIGS. 1–3, the mixed airflow $F_X$ enters the distribution chamber 32 in an inlet direction 18i (shown in FIGS. 1 and 2) substantially along the wall 4' of the distributor box 4 and substantially parallel to the pivot axis 39 of the distributor valve 30, heats the separation wall 33 and an outer wall 4" of the distributor box 4, and then turn its course substantially 90° in an outlet direction(s) $18_o'$ and/or $18_o"$ (shown in FIG. 3) towards the respective air outlets 22 and/or 34. At the same time, the airflow $F_X$ engages the vane members 50, which smoothly redirect the airflow $F_X$ from the inlet direction $18_i$ to the outlet direction(s) $18_o'$ and/or $18_o"$ toward the air outlets 22 and/or 34 providing less turbulence, thus better control and less resistance to the movement of the airflow within the distribution chamber 32.

When the distributor valve 30 is in its uppermost position as indicated in solid line in FIG. 3, the airflow $F_X$ is directed by the vane members 50" to the air outlets 34 leading to the back chamber 36, then to the demisting duct (not shown) and to the defrosting duct (not shown). Similarly, when the distributor valve 30 is in its lowermost position as indicated in dot lines in FIG. 3, the airflow $F_X$ is directed by the vane members 50' to the air outlet 22 leading to the front face opening duct (not shown) of the heating, ventilation and/or air conditioning apparatus of the present invention. When the distributor valve 30 is placed in the position somewhere between those two outermost positions, the airflow $F_X$ is directed to both air outlets 22 and 34 in a ratio depending on the angular position of the distributor valve 30 by both vane members 50' and 50".

Therefore, the distribution box of the heating, ventilation and/or air conditioning apparatus for the passenger compartment of the motor vehicle in accordance with the present invention, includes a novel arrangement of the pivoting distributor valve that provides less turbulence, better control and less resistance to the movement of the airflow within the front distribution chamber.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A distributor box for a heating and ventilating apparatus for a passenger compartment of a motor vehicle, said distributor box comprising:

an air inlet for admitting at least one of a heated airflow and a cold airflow into said distributor box therethrough;

a plurality of air outlets for leading said airflow to different zones of said passenger compartment; and at least one distributor valve pivotally mounted within said distributor box for pivoting movement between a plurality of positions to selectively distribute said airflow between said outlets, said distributor valve having opposite face surfaces, said distributor valve is provided with at least one vane member extending from at least one of said face surfaces for guiding said airflow from said air inlet toward at least one of said air outlets.

2. The distributor box as defined in claim 1, wherein said at least one vane member is integrally formed on said distributor valve.

3. The distributor box as defined in claim 1, wherein said vane member is homogeneously formed with said distributor valve as a unitary single-piece part.

4. The distributor box as defined in claim 1, wherein said opposite face surfaces of said distributor valve are substantially flat.

5. The distributor box as defined in claim 1, wherein said distributor valve is provided with a plurality of said vane members.

6. The distributor box as defined in claim 1, wherein each of said face surfaces of said distributor valve is provided with at least one of said vane members.

7. The distributor box as defined in claim 6, wherein each of said face surfaces of said distributor valve is provided with a plurality of said vane members.

8. The distributor box as defined in claim 7, wherein said vane members extend generally parallel to each other.

9. The distributor box as defined in claim 1, comprising two of said distributor valves each provided with at least one of said vane member.

10. The distributor box as defined in claim 1, wherein said at least one vane member extends from said at least one of said face surfaces substantially perpendicularly thereto.

11. The distributor box as defined in claim 1, wherein said airflow enters said distributor box in an inlet direction substantially parallel to an axis of rotation of said distributor valve.

12. The distributor box as defined in claim 11, wherein said airflow exits said distributor box in an outlet direction oriented at an angle with respect to said inlet direction.

13. The distributor box as defined in claim 12, wherein said opposite face surfaces of said distributor valve are substantially flat and said distributor valve is oriented for pivotal movement in a plane substantially orthogonal to said inlet direction.

14. The distributor box as defined in claim 13, wherein said at least one vane member extends from at least one of said face surfaces substantially perpendicularly thereto and contoured to facilitate a smooth transition of said airflow from said inlet direction to said outlet direction.

15. The distributor box as defined in claim 14, wherein said outlet direction is substantially perpendicular to said inlet direction.

16. The distributor box as defined in claim 1, wherein said at least one vane member is contoured to provide a smooth transition of said airflow from said air inlet toward said air outlets.

17. The distributor box as defined in claim 16, wherein said vane member is substantially L-shaped so as to redirect said airflow at substantially 90° angle.

* * * * *